June 3, 1952
O. J. EISELE
2,598,896
FULLY BALANCED COMBINATION OVERDRIVE
AND HYDRAULIC TRANSMISSION
Filed Sept. 16, 1950
4 Sheets-Sheet 3
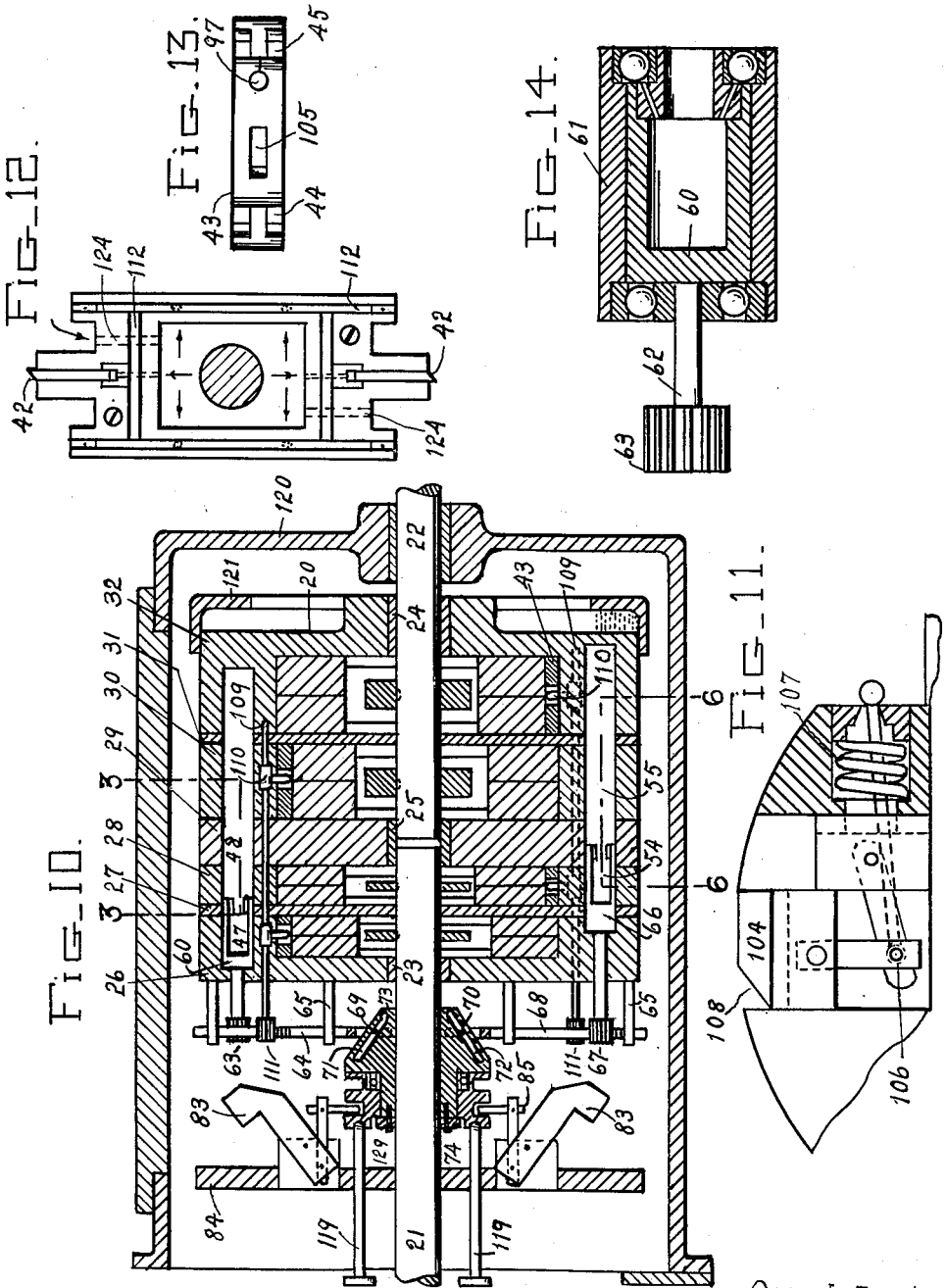
Otto J. Eisele.
INVENTOR.
BY Philip L. Whan
atty.

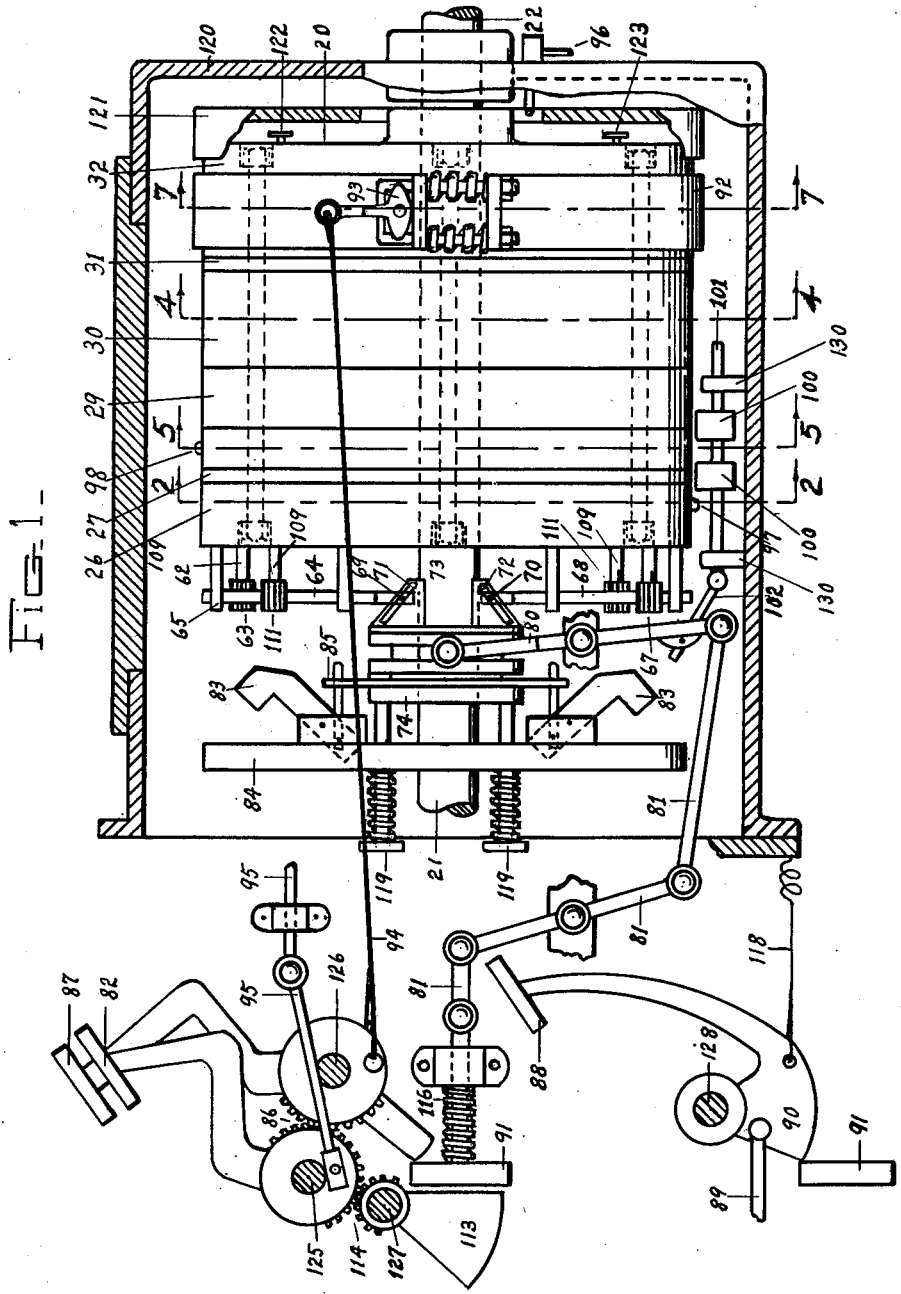

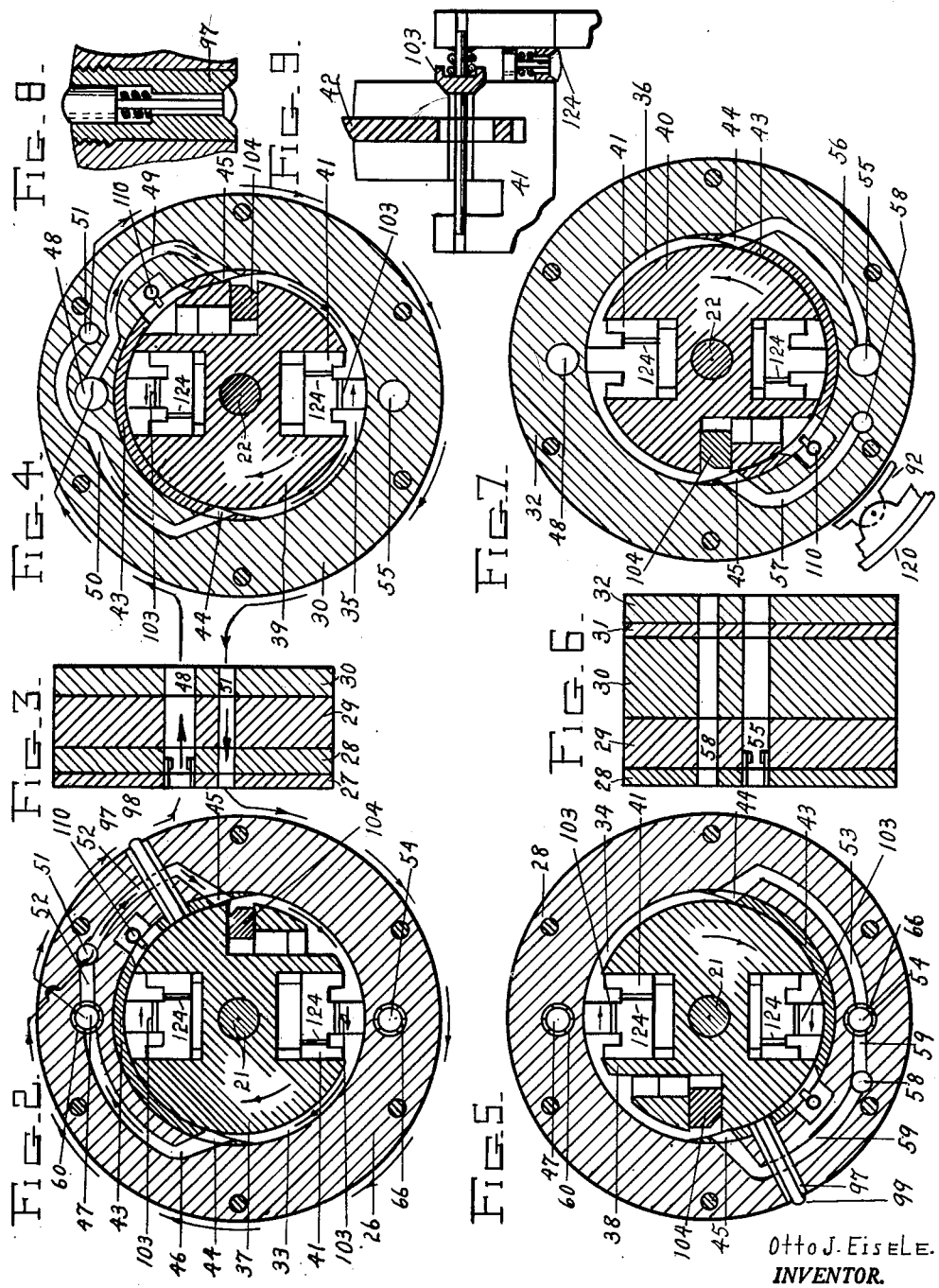

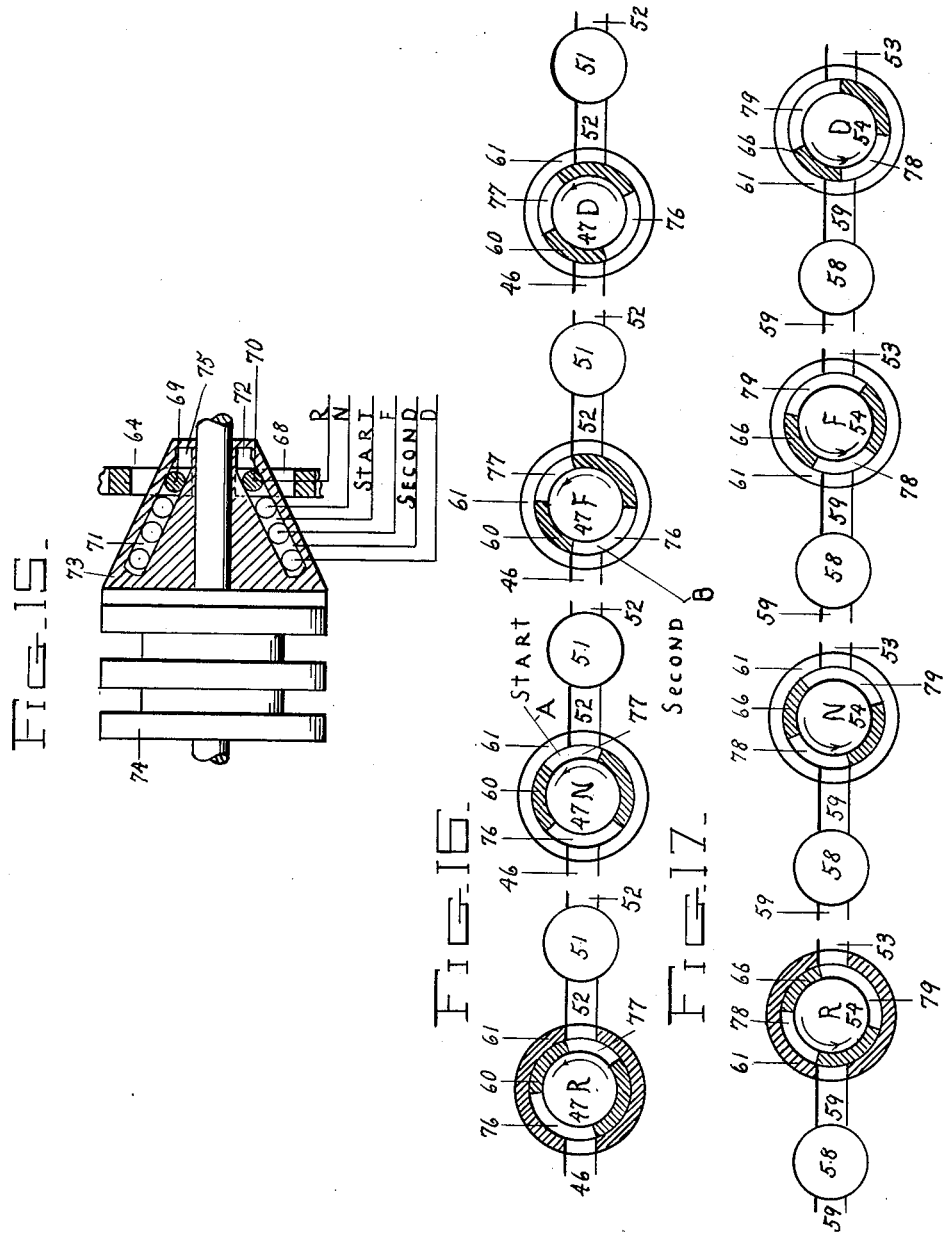

Patented June 3, 1952

2,598,896

UNITED STATES PATENT OFFICE 2,598,896

FULLY BALANCED COMBINATION OVER-DRIVE AND HYDRAULIC TRANSMISSION

Otto J. Eisele, New York, N. Y.

Application September 16, 1950, Serial No. 185,297

15 Claims. (Cl. 60—19)

The invention herein disclosed relates to hydraulic transmissions of the type covered in Patent No. 2,418,292 of April 1, 1947, and patent application Serial No. 758,685, filed July 2, 1947, now Patent No. 2,574,819.

The general objects of the invention are to provide a unitary form of transmission mechanism between the power source and driven parts, affording forward and reverse drive, manually and automatically controllable to effect progressive forward speed as power is applied, and optional reverse drive, together with a positive form of coupling in advanced stages of forward drive and means to afford over-drive.

Special objects of the invention are to maintain the mechanism constantly full of oil and to provide centrifugal locking mechanism in direct drive which will unlock at certain times to aid over-drive and, further, to apply hydraulic pressure as required to prevent slippage.

Further objects of the invention are to accomplish the results outlined in a fully balanced, smooth running, readily controlled mechanical structure free of complications, and practical and efficient in all respects.

Other desirable objects and novel features through which the purposes of the invention are attained are set forth or will appear in the course of the following specification.

The drawings accompanying and forming part of the specification illustrate a practical commercial embodiment of the invention. Structure, however, may be modified and changed, all within the true intent and broad scope of the invention as hereinafter defined and claimed.

Fig. 1 in the drawings is a partial sectional and side elevational view of one of the new transmission units;

Figs. 2, 3 and 4 are sectional views of the forward drive pump and motor elements, Fig. 2 being a transverse sectional view of the machine as on substantially the plane of line 2—2 of Fig. 1; Fig. 3 a broken longitudinal sectional view of adjoining partition forming members of the rotatable casing as on substantially the plane of line 3—3 of Fig. 10; and Fig. 4 being a transverse sectional view as on line 4—4 of Fig. 1, with arrows indicating direction of flow from the pump unit through intervening passages to the motor unit and back to the pump unit, under conditions of forward drive;

Figs. 5, 6 and 7 are similar views of the reverse drive pump and motor units with arrows indicating circulation of oil under reverse drive conditions, Figs. 5 and 7 being transverse sectional views of the casing as on substantially the planes of lines 5—5 and 7—7 of Fig. 1; and Fig. 6 being a broken longitudinal sectional view of adjoining partitions forming members of the casing, as on substantially the plane of line 6—6 of Fig. 10.

Fig. 8 is a broken sectional detail of one of the the relief valves in the outer circumference of the casing;

Fig. 9 is a broken sectional detail of one of the valves positioned in the end sections of the reciprocating pistons of the pumping units and the forward drive motor unit, and a broken sectional detail of one of the valves positioned in the outer sections of the reciprocating pistons of both pumping and motor units.

Fig. 10 is a substantially central, longitudinal sectional view of the mechanism shown in Fig. 1;

Fig. 11 is an enlarged broken sectional detail of one of the centrifugally operated locks for positive drive;

Fig. 12 is a face view of the transversely reciprocating piston structure of one of the rotors;

Fig. 13 is a plan view of one of the arcuate, ported cams in the cylindrical pump and motor chambers;

Fig. 14 is a longitudinal sectional view of one of the ported tubular oil flow regulating valves;

Fig. 15 is a broken side elevation of the sliding clutch collar that positions the tubular, rotatable control valves;

Fig. 16 is a diagrammatic view illustrating successive positions of one of the control valves for forward speed drive;

Fig. 17 is a corresponding view showing positions of the other central valve for reverse drive conditions.

The present invention is based largely on the form of mechanical clutch disclosed in Patent No. 2,418,292 and further developed in copending patent application Serial No. 758,685, now Patent No. 2,574,819, and involving hydraulic pump and motor units within a casing 20, rotatably mounted on the adjoining ends of coaxial motor driven and power take-off shafts 21 and 22, respectively.

Figs. 1 and 10 show this casing as a cylindrical structure concentrically journaled at 23, 24, on said shaft sections and carrying an intermediate bearing 25 piloting the adjoining ends of such sections.

The rotary casing is shown made up of adjoining disc-like sections 26, 27, 28, 29, 30, 31, 32, bolted or otherwise secured together.

Section 26 is shown as having a cylindrical forward drive pump chamber 33, section 28 as having a reverse drive cylindrical pump chamber 34, and section 30 as having a forward drive cylindrical motor chamber 35 and section 32 as having a reverse drive cylindrical pump chamber 36.

Rotors or impellers 37 and 38 are shown keyed on the power or driving shaft 21, operating in the forward drive and reverse pump chambers 33 and 34, and similarly, rotors 39 and 40 are shown keyed on the driven shaft 22 within the forward and reverse drive motor chambers 35 and 36.

All four of the pump and motor rotors or impellers may be constructed as in the patent and patent application above identified and as shown more fully in Figs. 2, 4, 5, 7 and 12 herein, embodying a piston structure 41 keyed for transverse reciprocation over the supporting shaft on which it is mounted and having sliding plates 42 at the opposite ends in close running engagement with the surrounding wall of the chamber.

Arcuate cams 43 in these chambers effect the transverse or crosswise reciprocation of the piston elements of the rotors, and these cams are shown as ported at the ends of the same, at 44, 45, in register with ports provided in the cylinder structure, the arrangement being to pass fluid from the forward drive pump back through the cylinder to the forward drive motor chamber and from the reverse drive pump back through the cylinder to the reverse drive motor chamber; also around the pumping units for idling speed.

The forward two-way drive passages, as shown in Figs. 2, 3 and 4, comprise a channel 46 extending from port 44 in the lead end of cam 43 to a longitudinally extending valve chamber 47, thence by passage 48 back through partition sections 27, 28, 29, 30 and channel 49 to port 45 in the end of the cam 43 in the forward drive motor chamber, with liquid returning through the motor chamber, cam port 44 and channel 50 through longitudinally extending passage 51 and channel 52, Fig. 2, to the return port 45 of the cam 43 in the forward pump chamber. The channel 52 between the valve chamber 47 and the passage 51 constructs a continuous oil passage around the pumping unit.

Similar circuits for the reverse drive fluid may be traced in Figs. 5, 6, and 7, including channel 53 from cam port 44 to cylindrical valve passage 54 and passage 55 through partition walls 28, 29, 30, 31, 32, and channel 56 to port 44 of the cam in the reverse drive motor chamber, with return flow from this motor chamber back through port 45, channel 57, passage 58, channel 59 and port 45 into the return side of the reverse pump chamber. The channel 59 between the passages 54 and 58 constructs a continuous oil passage around the pumping unit.

The forward and reverse drive control valves disposed in the longitudinally extending valve chambers or seats 47 and 54 may be constructed as shown in Fig. 14, which may be considered as representing the forward speed control valve 60. This is a hollow tubular valve element supported to rotate on ball bearings in the valve bushing 61 and having a shaft 62 projecting at the front of the casing and carrying a pinion 63 in mesh with a rack 64 supported in guides 65 in transversely slidable relation at the front end of the casing.

The other, reverse drive control valve 66 is similarly constructed, having a pinion 67 in mesh with transversely slidable rack bar 68.

The inner ends of slidable racks 64 and 68 carry pins or rolls 69, 70, riding in inclined slots 71, 72, in a transverse plate 73 rotatably mounted on motor driven shaft 21 and shiftable longitudinally thereon by clutch collar 74.

The rotary positions of the forward and reverse control valves 60 and 66 are thus determined by the longitudinal shifting movement of the clutch collar 74 and slotted rack actuating plate 73.

Fig. 15 shows how slots 71 and 72 are laid out with substantially parallel slots 75 nearest the shaft to allow for gas acceleration to prevent stalling, and brake action for reverse speed, with the inclined slots 71, 72, extending divergently away therefrom to provide successive valve positions for reverse (R), neutral (N), start, first (F), second direct drive (D).

These valves, the forward control valve 60 and reverse control valve 66, are linked up by the connections described take to the positions shown in Figs. 16 and 17, the forward control valve having side ports 76, 77, and the reverse control valve having side ports 78, 79.

Fig. 16 shows the successive positions of the forward control valve 60 for reverse, neutral, start, first, second and direct drive, and Fig. 17 shows the corresponding positions of the reverse control valve 66.

When the valves 60 and 66 are in reverse position, the shaft 21 is under idling speed, the casing is revolving and the shaft 22 remains stationary, and when the valves 60 and 66 are gradually turned to their neutral positions, the shaft 21 will continue its idling speed, the casing will gradually stop revolving and the shaft 22 will continue remaining stationary with its load.

It will be noted that when the valves 60 and 66 are in reverse position the port 78 is closed and the ports 79, 76 and 77 are open, and when in neutral position the ports 76, 77, 78, 79 are open, in which instance the oil will be continually pumped around both pumping units, and in the first instance oil will be continually pumped around the forward drive pump unit.

The successive positions of the ports 76, 77, 78, 79, show throughout that while attaining forward drive the reverse ports 78, 79, retain their neutral position, and while attaining reverse drive the ports 76, 77, retain a neutral position as means of preventing each drive from interfering with each other.

As the valves 60 and 66 are turned from reverse position to neutral position, and while starting, the gas is accelerated to prevent stalling of the engine, after which the gas is accelerated to attain first, second and direct drive on to the maximum speed of the engine or power source.

In effecting reverse drive the rotation of the casing is gradually stopped by means of a brake band 92, Fig. 1, supported in the housing in position to grip the casing, Fig. 7, and operated by a rocker cam 93 connected by link or cable 94 with the hub portion of reverse pedal 87, and a reverse speed will be attained in accordance with the gradual stopping of the casing, the valves 60 and 66 being in reverse position.

As the port 77 is turned to gradually close at A, Fig. 16, the oil is gradually stopped from being pumped around the forward drive pump unit and gradually diverted through passage 48 to the forward drive motor unit, thereby attaining a gradual starting speed, and when the port 77 is fully closed a full flow of oil will be forced and diverted to the forward motor unit, thereby attaining a first speed, and as the port 78 at B, Fig. 16, is gradually closed a second speed will be attained, and when port 78 is fully closed a direct speed will be attained, in which case the shafts 21 and 22 and the casing will revolve as a single unit. Corresponding movements of the valves 60 and 66 have been described and are shown in Figs. 16 and 17, and corresponding positions are shown in Figs. 15, 16, 17.

The parts described are so designed as to effect a gradual start and speed changing operation for both forward and reverse drives.

The clutch collar 74 is shown in Figs. 1 and 10 as arbitrarily operable through a clutch fork 80 and linkage 81 from a clutch collar controlling pedal 82, and additionally, centrifugal governor control is provided by means of governor weights 83 carried by fly-wheel element 84 and connected with the clutch collar through a yoke construction 85.

In Fig. 1 the valves 60, 66, and the collar are in the first position as shown in Figs. 15, 16, 17, the foot pedal 82 for gas acceleration and forward speeds is connected by gearing 86 with the foot pedal 87 for gas acceleration and reverse speed, and with the cam 113 by gear connections 114, said cam 113 to engage the abutment 91 constituting part of the forward and reverse drive clutch collar connections 81 and 80, the arm 115 as part of the pedal 87 to retract the clutch collar to its first position as the pedal 87 is employed, the retracting springs 116 and 117 assisting.

The brake pedal shown at 88 in Fig. 1 is connected with the brakes of the car by linkage 89, and it is shown as having a cam portion 90 to engage the abutment 91 so as to effect declutching action before brake application. Pedal 88 is retracted by spring 118.

The retracting spring supports 119 project from the collar 74 through the fly-wheel 84 and carry the springs 117.

In accordance with the above it will be noted that regardless of which foot pedal is applied, engagements and disengagements are absolutely certain, assuring reliable and safe driving.

The so-called pedal 82 is shown as operable also as an accelerator pedal by having connections 95 extending therefrom to the carburetor or fuel supply device. The connecting gearing 86 between the hub of this pedal and the hub of the reverse pedal effects carburetor control, whichever of these pedals is operated.

The stationary housing 120 for the casing 20 is shown as constructed to form an oil container having a pump 96 to pump oil into the oil container 121 on the far side of the casing 20. Two check valves 97, Figs. 2, 5 and 8, are provided having exposed push-buttons 98, 99, Fig. 1, for momentarily enabling escape of trapped air, said valves to open as the abutments 100 on the sliding rod 101, Fig. 1, connected by link 102 with the link or arm 81 of the clutch fork 80, momentarily contact the push-buttons 98 and 99. While the casing is rotating the oil in the oil passages will be centrifugally forced outward so that any air in these passages may be released by valves 97. Also, these valves 97 may act as relief valves in case of excessive heat being generated, for instance, in driving up a steep incline for a considerable distance in lower speed than direct drive, any oil or air ejected being automatically replaced by the check valves 122 and 123 leading to the passages 51 and 59 from the oil container 121, to keep all oil passages continually full of oil. The sliding rod 101 is slidably fitted in the slide ways 130.

Fig. 9 shows how the reciprocating pistons in Figs. 2, 4 and 5, are equipped with valves 103 to enable over-drive effect, the valves 103 automatically relieving pressure for this purpose when gas is re-accelerated and the car drives forward on its own momentum, the arrows in Figs. 2, 4 and 5 showing the direction of oil flow under the stated circumstances. It will be noted that no valves are in the piston in Fig. 7, but the ports 78 and 79 in valve 66 remain open when in direct drive or under any forward speed, thus compensating for the unwanted valves and preventing blockage.

In driving down hills the foot brake pedal 88 may be employed to force the mechanism into second or low speed position of the control valves 60 and 66 to effect braking action.

Each of the four rotors is shown as having a locking slide or bolt 104, Fig. 11, to engage a slot 105 in the cam associated with each rotor. These locking bolts are shown as actuated by pivotally connected toggle links 106 under pressure of spring 107. Centrifugal force acting against the spring tension will effect the engagement of these locks to accomplish direct drive. Beveled forward faces 108 on the locking bolts permit them to slip past the cams until a full locking position is resumed, and it will be noted in Figs. 2, 4, 5 and 7, that the rotors of the pumping units, Figs. 2 and 4, will lock with the casing 20, and the casing will lock with the rotors of the motor units, Figs. 5 and 7, preventing interference with over-drive as the gas is re-accelerated and the car drives forward on its own momentum, and preventing slippage when in direct drive.

To prevent locking of the bolts 104 when the shaft 21 is under idling speed, shafts 109 are journaled in the casing 20, having stop or trip lugs 110 to extend through the locking slots 105 in the cams, these shafts being turned by the racks 64, 68, through the medium of pinions 111, Fig. 10, on the outer ends of the shafts. It is also the object of the trip lugs 110, though only as a safety measure, to disengage any stuck lock while retracting to idling speed.

The reciprocating pistons 41 may be constructed as shown in Fig. 12, with packing strips 112 and sliding plates 42, ported to admit oil pressure back of the same to maintain the pumping, and motor units in close fitting operation in the respective chambers, hydraulic pressure being imparted to said strips and plates through the check valves 124, as shown in Figs. 2, 4, 5 and 7.

Sections 73 and 74 of the clutch collar arrangement revolve independently of each other, with a ball-bearing 129 interposed.

The shafts 125, 126, 127 and 128 are suitably journaled in or between bearings.

The revolving parts of the mechanism are located and arranged in balanced relation so as to assure quiet, vibrationless, smooth action.

To afford desirable gear reduction the pump units indicated in Fig. 10 may be of smaller displacement than the motor units, for example, in a three or four-to-one ratio.

By reducing power input the clutch collar may shift to effect a lower speed drive relation, thus to utilize the braking power of the engine.

Built as disclosed, the casing and internal parts can be produced and assembled at reasonable cost.

While particularly for automobile drive, the invention has special advantages for many other purposes, such as for powering ships, trains or the like.

What is claimed is:

1. In a fully balanced combination over-drive and hydraulic transmission, a rotatable circular casing consisting of a plurality of circular sections comprising four successive cylindrical chambers, a driven shaft concentrically journaled in the casing and through the first and second chambers and a drive shaft concentrically journaled in the casing and through the third and fourth chambers, twin pumping units keyed to the driven shaft and twin motor units keyed to the drive shaft and fitted to rotate in said chambers, a hydraulic ratio between said pumping and motor units, said pumping and motor units consisting of rotors having two segments with a connecting bridge therebetween, said shafts fixed through the centers of said bridges, a sliding piston fitted to slide between said segments, said pistons consisting of two halves, each half being slotted or grooved and having a rectangular opening to allow free motion of the sliding pistons relative to reciprocation after said halves are loosely assembled over the said bridges and shaft and securely bolted or attached together, arcuate pieces positioned alternately and correspondingly and secured in said successive chambers, arcuate beveled end sections of said arcuate pieces imparting reciprocatory motion to said sliding pistons, controllable fluid passages in said casing leading from the first chamber to the third chamber and from the third chamber back to the first chamber for forward drive, and from the second chamber to the fourth chamber and from the fourth chamber back to the second chamber for reverse drive, said passages to converge with the ports in the arcuate beveled end sections of said arcuate pieces, oil channels in the casing over the first and second chambers, each channel to converge with each of the aforesaid oil passages to form a continuous oil circuit around the pumping units and thereby forming two separate, two-way, endless oil passages, said pistons having over-drive imparting check valves positioned in their outer end sections with the exception of the piston in the fourth chamber, said valves positioned to have their seats on the pressure imparting sides in the first and second chambers and on the pressure receiving sides in the third chamber, the ports of the two-way tubular oil flow regulating valve in the casing over the second chamber to be kept open additionally while in direct drive to compensate for the unwanted valves in the piston in the fourth chamber, respectively.

2. In a fully balanced combination over-drive and hydraulic transmission, a rotatable circular casing consisting of a plurality of circular sections comprising four successive cylindrical chambers, a driven shaft concentrically journaled in the casing and through the first and second chambers and a drive shaft concentrically journaled in the casing and through the third and fourth chambers, twin pumping units keyed to the driven shaft and twin motor units keyed to the drive shaft and fitted to rotate in said chambers, a hydraulic ratio between said pumping and motor units, said pumping and motor units consisting of rotors having two segments with a connecting bridge therebetween, said shafts fixed through the centers of said bridges, a sliding piston fitted to slide between said segments, said pistons consisting of two halves, each half being slotted or grooved and having a rectangular opening to allow free motion of the sliding pistons relative to reciprocation after said halves are loosely assembled over the said bridges and shaft and securely bolted or attached together, arcuate pieces positioned alternately and correspondingly and secured in said successive chambers, arcuate beveled end sections of said arcuate pieces imparting reciprocatory motion to said sliding pistons, controllable fluid passages in said casing leading from the first chamber to the third chamber and from the third chamber back to the first chamber for forward drive, and from the second chamber to the fourth chamber and from the fourth chamber back to the second chamber for reverse drive, said passages to converge with the ports in the arcuate beveled end sections of said arcuate pieces, oil channels in the casing over the first and second chambers, each channel to converge with each of the aforesaid oil passages to form a continuous oil circuit around the pumping units and thereby forming two separate, two-way, endless oil passages, said pistons having over-drive imparting check valves positioned in their outer end sections with the exception of the piston in the fourth chamber, said valves positioned to have their seats on the pressure imparting sides in the first and second chambers and on the pressure receiving sides in the third chamber, the ports of the two-way tubular oil flow regulating valve in the casing over the second chamber to be kept open additionally while in direct drive to compensate for the unwanted valves in the piston in the fourth chamber, respectively, said reciprocating pistons having rings conforming with their shape, rectangular pieces slidably inserted in slots and projecting from their ends, holes from the inner spaces of said pistons leading to the back of said rings and pieces, intake check valves positioned in said pistons to lead from their pressure receiving sides to the inner spaces of said pistons to force the rings against the surfaces of their respective chambers by hydraulic force and thereby prevent slippage.

3. In a fully balanced combination over-drive and hydraulic transmission, a rotatable circular casing consisting of a plurality of circular sections comprising four successive cylindrical chambers, a driven shaft concentrically journaled in the casing and through the first and second chambers and a drive shaft concentrically journaled in the casing and through the third and fourth chambers, twin pumping units keyed to the driven shaft and twin motor units keyed to the drive shaft and fitted to rotate in said chambers, a hydraulic ratio between said pumping and motor units, said pumping and motor units consisting of rotors having two segments with a connecting bridge therebetween, said shafts fixed through the centers of said bridges, a sliding piston fitted to slide between said segments, said pistons consisting of two halves, each half being slotted or grooved and having a rectangular opening to allow free motion of the sliding pistons relative to reciprocation after said halves are loosely assembled over the said bridges and shaft and securely bolted or attached together, arcuate pieces positioned alternately and correspondingly and secured in said successive chambers, arcuate beveled end sections of said arcuate pieces imparting reciprocatory motion to said sliding pistons, controllable fluid passages in said casing leading from the first chamber to the third chamber and from the third chamber back to the first chamber for forward drive, and from the second chamber to the fourth chamber and from the fourth chamber back to the second chamber for reverse drive, said passages to converge with the ports in the arcuate beveled end sections of said arcuate pieces, oil channels in the casing over the first and second chambers, each channel to converge with each of the aforesaid oil passages to form a continuous oil circuit around the pumping units and thereby forming two separate, two-way, endless oil passages, said pistons having over-drive imparting check valves positioned in their outer end sections with the exception of the piston in the fourth chamber, said valves positioned to have their seats on the pressure imparting sides in the first and second chambers and on the pressure receiving sides in the third chamber, the ports of the two-way tubular oil flow regulating valve in the casing over the second chamber to be kept open additionally while in direct drive to compensate for the unwanted valves in the piston in the fourth chamber, respectively, said arcuate pieces having slots to lock and unlock locks positioned in the rotors, said locks having springs to resist a certain pull of centrifugal force in accordance with the revolutions of the driven shaft, after which the locks will lock with their respective slots, said slots being beveled on one end to meet the beveled ends of the lock bolts to unlock the locks, two rack controlled shafts journaled in the casing and having cams, said cams being turned and positioned to prevent the locks from locking and to allow them to lock, under proper adjustment and timing, substantially as described.

4. In a fully balanced combination over-drive and hydraulic transmission, a rotatable circular casing consisting of a plurality of circular sections comprising four successive cylindrical chambers, a driven shaft concentrically journaled in the casing and through the first and second chambers and a drive shaft concentrically journaled in the casing and through the third and fourth chambers, twin pumping units keyed to the driven shaft and twin motor units keyed to the drive shaft and fitted to rotate in said chambers, a hydraulic ratio between said pumping and motor units, said pumping and motor units consisting of rotors having two segments with a connecting bridge therebetween, said shafts fixed through the centers of said bridges, a sliding piston fitted to slide between said segments, said pistons consisting of two halves, each half being slotted or grooved and having a rectangular opening to allow free motion of the sliding pistons relative to reciprocation after said halves are loosely assembled over the said bridges and shaft and securely bolted or attached together, arcuate pieces positioned alternately and correspondingly and secured in said successive chambers, arcuate beveled end sections of said arcuate pieces imparting reciprocatory motion to said sliding pistons, controllable fluid passages in said casing leading from the first chamber to the third chamber and from the third chamber back to the first chamber for forward drive, and from the second chamber to the fourth chamber and from the fourth chamber back to the second chamber for reverse drive, said passages to converge with the ports in the arcuate beveled end sections of said arcuate pieces, oil channels in the casing over the first and second chambers, each channel to converge with each of the aforesaid oil passages to form a continuous oil circuit around the pumping units and thereby forming two separate, two-way, endless oil passages, said pistons having over-drive imparting check valves positioned in their outer end sections with the exception of the piston in the fourth chamber, said valves positioned to have their seats on the pressure imparting sides in the first and second chambers and on the pressure receiving sides in the third chamber, the ports of the two-way tubular oil flow regulating valve in the casing over the second chamber to be kept open additionally while in direct drive to compensate for the unwanted valves in the piston in the fourth chamber, respectively, rotatable, two-way, tubular, ported, oil flow regulating valves journaled in a ported bushing to alternately turn on two ball-bearings, a perforated stud having a concentric hole, said stud forced into said valve, a ball-bearing forced on to said stud and into the said bushing, said valve being positioned in the casing over the first chamber to regulate the flow of oil in the oil passage leading to the third chamber and the channel leading to the return passage in the first chamber, said valve positioned in the casing over the second chamber to regulate the flow of oil in the oil passage leading to the fourth chamber and the channel leading to the return passage in the second chamber, ports in the said valves to regulate the flow of oil to attain variable speeds forward and a reverse speed, both speeds starting gradually and continuing on to direct drive or full reverse, said valves having shafts projecting from the casing, a gear secured to said shafts, said gears meshing with slidably secured reciprocating rack bars, and means to actuate said bars.

5. In a fully balanced combination over-drive and hydraulic transmission, a rotatable circular casing consisting of a plurality of circular sections comprising four successive cylindrical chambers, a driven shaft concentrically journaled in the casing and through the first and second chambers and a drive shaft concentrically journaled in the casing and through the third and fourth chambers, twin pumping units keyed to the driven shaft and twin motor units keyed to the drive shaft and fitted to rotate in said chambers, a hydraulic ratio between said pumping and motor units, said pumping and motor units consisting of rotors having two segments with a connecting bridge therebetween, said shafts fixed through the centers of said bridges, a sliding piston fitted to slide between said segments, said pistons consisting of two halves, each half being slotted or grooved and having a rectangular opening to allow free motion of the sliding pistons relative to reciprocation after said halves are loosely assembled over the said bridges and shaft and securely bolted or attached together, arcuate pieces positioned alternately and correspondingly and secured in said successive chambers, arcuate beveled end sections of said arcuate pieces imparting reciprocatory motion to said sliding pistons, controllable fluid passages in said casing leading from the first chamber to the third chamber and from the third chamber back to the first chamber for forward drive, and from the second chamber to the fourth chamber and from the fourth chamber back to the second chamber for reverse drive, said passages to converge with the ports in the arcuate beveled end sections of said arcuate pieces, oil channels in the casing over the first and second chambers, each channel to converge with each of the aforesaid oil passages to form a continuous oil circuit around the pumping units and thereby forming two separate, two-way, endless oil passages, said pistons having over-drive imparting check valves positioned in their outer end sections with the exception of the piston in the fourth chamber, said valves positioned to have their seats on the pressure imparting sides in the first and second chambers and on the pressure receiving sides in the third chamber, the ports of the two-way tubular oil flow regulating valve in the casing over the second chamber to be kept open additionally while in direct drive to compensate for the unwanted valves in the piston in the fourth chamber, respectively, a casing having two separate, two-way, endless oil passages, a ported tubular valve positioned in each to regulate the flow of oil in both endless passages of said two-way endless oil passages to attain an idling position, gradual starting positions for forward speed, and positions for variable speeds ahead, the valve controlling reverse speed being closed and the valve controlling forward speed being open to attain said idling position, and under said idling position the driven shaft and the casing will revolve and the drive shaft will remain stationary, and means to stop the casing from revolving to attain a gradual starting and increasing reverse speed.

6. In a fully balanced combination over-drive and hydraulic transmission, a rotatable circular casing consisting of a plurality of circular sections comprising four successive cylindrical chambers, a driven shaft concentrically journaled in the casing and through the first and second chambers and a drive shaft concentrically journaled in the casing and through the third and fourth chambers, twin pumping units keyed to the driven shaft and twin motor units keyed to the drive shaft and fitted to rotate in said chambers, a hydraulic ratio between said pumping and motor units, said pumping and motor units consisting of rotors having two segments with a connecting bridge therebetween, said shafts fixed through the centers of said bridges, a sliding piston fitted to slide between said segments, said pistons consisting of two halves, each half being slotted or grooved and having a rectangular opening to allow free motion of the sliding pistons relative to reciprocation after said halves are loosely assembled over the said bridges and shaft and securely bolted or attached together, arcuate pieces positioned alternately and correspondingly and secured in said successive chambers, arcuate beveled end sections of said arcuate pieces imparting reciprocatory motion to said sliding pistons, controllable fluid passages in said casing leading from the first chamber to the third chamber and from the third chamber back to the first chamber for forward drive, and from the second chamber to the fourth chamber and from the fourth chamber back to the second chamber for reverse drive, said passages to converge with the ports in the arcuate beveled end sections of said arcuate pieces, oil channels in the casing over the first and second chambers, each channel to converge with each of the aforesaid oil passages to form a continuous oil circuit around the pumping units and thereby forming two separate, two-way, endless oil passages, said pistons having over-drive imparting check valves positioned in their outer end sections with the exception of the piston in the fourth chamber, said valves positioned to have their seats on the pressure imparting sides in the first and second chambers and on the pressure receiving sides in the third chamber, the ports of the two-way tubular oil flow regulating valve in the casing over the second chamber to be kept open additionally while in direct drive to compensate for the unwanted valves in the piston in the fourth chamber, respectively, a casing having two separate, two-way, endless oil passages, a ported tubular valve positioned in each to regulate the flow of oil in both endless passages of said two-way, endless oil passages to attain an idling position, and as the racks intermeshing with the gears of the said tubular valves are moved outward said valves will turn progressively away from said idling position on to neutral position, on to starting position, on to first speed, on to second speed, and on to direct drive, the driven shaft and the drive shaft to act as a single shaft when in direct drive, and means to actuate said racks.

7. In a fully balanced combination over-drive and hydraulic transmission, a rotatable circular casing consisting of a plurality of circular sections comprising four successive cylindrical chambers, a driven shaft concentrically journaled in the casing and through the first and second chambers and a drive shaft concentrically journaled in the casing and through the third and fourth chambers, twin pumping units keyed to the driven shaft and twin motor units keyed to the drive shaft and fitted to rotate in said chambers, a hydraulic ratio between said pumping and motor units, said pumping and motor units consisting of rotors having two segments with a connecting bridge therebetween, said shafts fixed through the centers of said bridges, a sliding piston fitted to slide between said segments, said pistons consisting of two halves, each half being slotted or grooved and having a rectangular opening to allow free motion of the sliding pistons relative to reciprocation after said halves are loosely assembled over the said bridges and shaft and securely bolted or attached together, arcuate pieces positioned alternately and correspondingly and secured in said successive chambers, arcuate beveled end sections of said arcuate pieces imparting reciprocatory motion to said sliding pistons, controllable fluid passages in said casing leading from the first chamber to the third chamber and from the third chamber back to the first chamber for forward drive, and from the second chamber to the fourth chamber and from the fourth chamber back to the second chamber for reverse drive, said passages to converge with the ports in the arcuate beveled end sections of said arcuate pieces, oil channels in the casing over the first and second chambers, each channel to converge with each of the aforesaid oil passages to form a continuous oil circuit around the pumping units and thereby forming two separate, two-way, endless oil passages, said pistons having over-drive imparting check valves positioned in their outer end sections with the exception of the piston in the fourth chamber, said valves positioned to have their seats on the pressure imparting sides in the first and second chambers and on the pressure receiving sides in the third chamber, the ports of the two-way tubular oil flow regulating valve in the casing over the second chamber to be kept open additionally while in direct drive to compensate for the unwanted valves in the piston in the fourth chamber, respectively, valves leading from the outer circumference of the casing to the inner circumference of the arcuate pieces in the first and second chambers, said valves having stems slightly projecting from the casing, said stems, as the casing revolves, momentarily contacting studs fixed to a rod slidably fitted between two fixed brackets, said studs not to make contact when in direct drive, a circular oil container fixed to the far side of the casing, an intake check valve leading from said container to each of the endless oil passages, an oil pump to supply said container, and means to actuate said slidable rod, said studs on said rod being adjustable.

8. In a fully balanced combination over-drive and hydraulic transmission, a rotatable circular casing consisting of a plurality of circular sections comprising four successive cylindrical chambers, a driven shaft concentrically journaled in the casing and through the first and second chambers and a drive shaft concentrically journaled in the casing and through the third and fourth chambers, twin pumping units keyed to the driven shaft and twin motor units keyed to the drive shaft and fitted to rotate in said chambers, a hydraulic ratio between said pumping and motor units, said pumping and motor units consisting of rotors having two segments with a connecting bridge therebetween, said shafts fixed through the centers of said bridges, a sliding piston fitted to slide between said segments, said pistons consisting of two halves, each half being slotted or grooved and having a rectangular opening to allow free motion of the sliding pistons relative to reciprocation after said halves are loosely assembled over the said bridges and shaft and securely bolted or attached together, arcuate pieces positioned alternately and correspondingly and secured in said successive chambers, arcuate beveled end sections of said arcuate pieces imparting reciprocatory motion to said sliding pistons, controllable fluid passages in said casing leading from the first chamber to the third chamber and from the third chamber back to the first chamber for forward drive, and from the second chamber to the fourth chamber and from the fourth chamber back to the second chamber for reverse drive, said passages to converge with the ports in the arcuate beveled end sections of said arcuate pieces, oil channels in the casing over the first and second chambers, each channel to converge with each of the aforesaid oil passages to form a continuous oil circuit around the pumping units and thereby forming two separate, two-way, endless oil passages, said pistons having over-drive imparting check valves positioned in their outer end sections with the exception of the piston in the fourth chamber, said valves positioned to have their seats on the pressure imparting sides in the first and second chambers and on the pressure receiving sides in the third chamber, the ports of the two-way tubular oil flow regulating valve in the casing over the second chamber to be kept open additionally while in direct drive to compensate for the unwanted valves in the piston in the fourth chamber, respectively, a circular clutch collar journaled on the driven shaft, said collar consisting of two sections, each revolving independently of each other, a ball-bearing positioned between said sections, one section having parallel sides with slanted and continued horizontal slots through said sides, a roller of the rack bars positioned in said slots to impart reciprocating motion to said racks, said racks accordingly turning the tubular oil flow regulating valves and the shaft of the lock controlling cams, the other section having two circular grooves to engage yokes, a fork fitted to each yoke to impart reciprocating motion to said collar and cooperation between said slots and tubular valves to permit sufficient gas acceleration to prevent stalling of the driven shaft before starting in forward or reverse speeds, and means to actuate said forks.

9. In a fully balanced combination over-drive and hydraulic transmission, a rotatable circular casing consisting of a plurality of circular sections comprising four successive cylindrical chambers, a driven shaft concentrically journaled in the casing and through the first and second chambers and a drive shaft concentrically journaled in the casing and through the third and fourth chambers, twin pumping units keyed to the driven shaft and twin motor units keyed to the drive shaft and fitted to rotate in said chambers, a hydraulic ratio between said pumping and motor units, said pumping and motor units consisting of rotors having two segments with a connecting bridge therebetween, said shafts fixed through the centers of said bridges, a sliding piston fitted to slide between said segments, said pistons consisting of two halves, each half being slotted or grooved and having a rectangular opening to allow free motion of the sliding pistons relative to reciprocation after said halves are loosely assembled over the said bridges and shaft and securely bolted or attached together, arcuate pieces positioned alternately and correspondingly and secured in said successive chambers, arcuate beveled end sections of said arcuate pieces imparting reciprocatory motion to said sliding pistons, controllable fluid passages in said casing leading from the first chamber to the third chamber and from the third chamber back to the first chamber for forward drive, and from the second chamber to the fourth chamber and from the fourth chamber back to the second chamber for reverse drive, said passages to converge with the ports in the arcuate beveled end sections of said arcuate pieces, oil channels in the casing over the first and second chambers, each channel to converge with each of the aforesaid oil passages to form a continuous oil circuit around the pumping units and thereby forming two separate, two-way, endless oil passages, said pistons having over-drive imparting check valves positioned in their outer end sections with the exception of the piston in the fourth chamber, said valves positioned to have their seats on the pressure imparting sides in the first and second chambers and one the pressure receiving sides in the third chamber, the ports of the two-way tubular oil flow regulating valve in the casing over the second chamber to be kept open additionally while in direct drive to compensate for the unwanted valves in the piston in the fourth chamber, respectively, centrifugal weights or governors pivotally secured to a fly-wheel, the opposite arms of said weights pivotally linked to the fork engaging a yoke of the clutch collar, a manipulated fork having a fixed fulcrum also engaging a yoke of the clutch collar, the centrifugal force imparted by the centrifugal weights and the force of foot manipulation imparting reciprocating motion to the said clutch collar, and means to actuate the arm opposite the last mentioned fork.

10. In a fully balanced combination over-drive and hydraulic transmission, a rotatable circular casing consisting of a plurality of circular sections comprising four successive cylindrical chambers, a driven shaft concentrically journaled in the casing and through the first and second chambers and a drive shaft concentrically journaled in the casing and through the third and fourth chambers, twin pumping units keyed to the driven shaft and twin motor units keyed to the drive shaft and fitted to rotate in said chambers, a hydraulic ratio between said pumping and motor units, said pumping and motor units consisting of rotors having two segments with a connecting bridge therebetween, said shafts fixed through the centers of said bridges, a sliding piston fitted to slide between said segments, said pistons consisting of two halves, each half being slotted or grooved and having a rectangular opening to allow free motion of the sliding pistons relative to reciprocation after said halves are loosely assembled over the said bridges and shaft and securely bolted or attached together, arcuate pieces positioned alternately and correspondingly and secured in said successive chambers, arcuate beveled end sections of said arcuate pieces imparting reciprocatory motion to said sliding pistons, controllable fluid passages in said casing leading from the first chamber to the third chamber and from the third chamber back to the first chamber for forward drive, and from the second chamber to the fourth chamber and from the fourth chamber back to the second chamber for reverse drive, said passages to converge with the ports in the arcuate beveled end sections of said arcuate pieces, oil channels in the casing over the first and second chambers, each channel to converge with each of the aforesaid oil passages to form a continuous oil circuit around the pumping units and thereby forming two separate, two-way, endless oil passages, said pistons having over-drive imparting check valves positioned in their outer end sections with the exception of the piston in the fourth chamber, said valves positioned to have their seats on the pressure imparting sides in the first and second chambers and on the pressure receiving sides in the third chamber, the ports of the two-way tubular oil flow regulating valve in the casing over the second chamber to be kept open additionally while in direct drive to compensate for the unwanted valves in the piston in the fourth chamber, respectively, a gas accelerating and clutch collar operating foot pedal, said pedal being of the rocker type, the toothed hub of said pedal being keyed to a shaft journaled between two fixed bearings, said teeth intermeshing with the teeth of a cam also keyed to a shaft and journaled between two fixed bearings, a link pivotally connecting the hub of the foot pedal to a rod fitted in a fixed slideway, said rod leading to a throttle valve of a carburetor, the reciprocating motion transmitted to said rod oscillating said throttle valve and thereby accelerating the gas for either forward or reverse speeds.

11. In a fully balanced combination over-drive and hydraulic transmission, a rotatable circular casing consisting of a plurality of circular sections comprising four successive cylindrical chambers, a driven shaft concentrically journaled in the casing and through the first and second chambers and a drive shaft concentrically journaled in the casing and through the third and fourth chambers, twin pumping units keyed to the driven shaft and twin motor units keyed to the drive shaft and fitted to rotate in said chambers, a hydraulic ratio between said pumping and motor units, said pumping and motor units consisting of rotors having two segments with a connecting bridge therebetween, said shafts fixed through the centers of said bridges, a sliding piston fitted to slide between said segments, said pistons consisting of two halves, each half being slotted or grooved and having a rectangular opening to allow free motion of the sliding pistons relative to reciprocation after said halves are loosely assembled over the said bridges and shaft and securely bolted or attached together, arcuate pieces positioned alternately and correspondingly and secured in said successive chambers, arcuate beveled end sections of said arcuate pieces imparting reciprocatory motion to said sliding pistons, controllable fluid passages in said casing leading from the first chamber to the third chamber and from the third chamber back to the first chamber for forward drive, and from the second chamber to the fourth chamber and from the fourth chamber back to the second chamber for reverse drive, said passages to converge with the ports in the arcuate beveled end sections of said arcuate pieces, oil channels in the casing over the first and second chambers, each channel to converge with each of the aforesaid oil passages to form a continuous oil circuit around the pumping units and thereby forming two separate, two-way, endless oil passages, said pistons having over-drive imparting check valves positioned in their outer end sections with the exception of the piston in the fourth chamber, said valves positioned to have their seats on the pressure imparting sides in the first and second chambers and on the pressure receiving sides in the third chamber, the ports of the two-way tubular oil flow regulating valve in the casing over the second chamber to be kept open additionally while in direct drive to compensate for the unwanted valves in the piston in the fourth chamber, respectively, a gas accelerating and clutch collar operating foot pedal, said pedal being of the rocker type, the toothed hub of said pedal being keyed to a shaft journaled between two fixed bearings, said teeth intermeshing with the teeth of a cam also keyed to a shaft and journaled between two fixed bearings, said cam having a radial side and radial arc, said side positioned parallel to a block having a rod extending therefrom while the driven shaft is idling, said rod slidably fitted in a slideway, a link, fixed rockers and a link pivotally connecting said rod and the arm of the fork adapted to transmit reciprocating motion to the clutch collar in cooperation with the centrifugal weights, said arm of said fork having a pivotally connected link pivotally connected to the rod and having contact studs that momentarily contact the stems of the valves that project from the casing, the spring positioned between the said block and slideway, and the springs positioned on the rods leading from the clutch collar and through the fly-wheel being adapted to retract the aforesaid foot pedal, and after the block is pushed far enough to attain direct drive the radial arc of the aforementioned cam will slide over the edge of the block, thereby permitting the foot pedal, under pressure, to continue to accelerate the gas until maximum speed of the driven shaft is attained, if so desired.

12. In a fully balanced combination over-drive and hydraulic transmission, a rotatable circular casing consisting of a plurality of circular sections comprising four successive cylindrical chambers, a driven shaft concentrically journaled in the casing and through the first and second chambers and a drive shaft concentrically journaled in the casing and through the third and fourth chambers, twin pumping units keyed to the driven shaft and twin motor units keyed to the drive shaft and fitted to rotate in said chambers, a hydraulic ratio between said pumping and motor units, said pumping and motor units consisting of rotors having two segments with a connecting bridge therebetween, said shafts fixed through the centers of said bridges, a sliding piston fitted to slide between said segments, said pistons consisting of two halves, each half being slotted or grooved and having a rectangular opening to allow free motion of the sliding pistons relative to reciprocation after said halves are loosely assembled over the said bridges and shaft and securely bolted or attached together, arcuate pieces positioned alternately and correspondingly and secured in said successive chambers, arcuate beveled end sections of said arcuate pieces imparting reciprocatory motion to said sliding pistons, controllable fluid passages in said casing leading from the first chamber to the third chamber back and from the third chamber back to the first chamber for forward drive, and from the second chamber to the fourth chamber and from the fourth chamber back to the second chamber for reverse drive, said passages to converge with the ports in the arcuate beveled end sections of said arcuate pieces, oil channels in the casing over the first and second chambers, each channel to converge with each of the aforesaid oil passages to form a continuous oil circuit around the pumping units and thereby forming two separate, two-way, endless oil passages, said pistons having over-drive imparting check valves positioned in their outer end sections with the exception of the piston in the fourth chamber, said valves positioned to have their seats on the pressure imparting sides in the first and second chambers and on the pressure receiving sides in the third chamber, the ports of the two-way tubular oil flow regulating valve in the casing over the second chamber to be kept open additionally while in direct drive to compensate for the unwanted valves in the piston in the fourth chamber, respectively, a gas accelerating and clutch collar operating foot pedal, the hub of said pedal having teeth and being keyed to a shaft journaled between two fixed bearings, said teeth intermeshing with the teeth of a cam also keyed to a shaft and journaled between two fixed bearings, said cam having a radial side and a radial arc, a reverse foot pedal having a combination toothed hub and projecting cam, said hub keyed to a shaft and journaled between two bearings, said teeth intermeshing with the teeth of the toothed hub of the gas accelerating and clutch collar operating foot pedal, a block having a rod thereof slidably fitted in a fixed slideway, means between said rod and clutch collar to impart reciprocating motion to said collar, and when the driven shaft is under idling speed the radial side of the aforesaid cam is set parallel to the block and the projecting cam is set to touch the upper edge of the opposite side of the block to force said block to its original position before a cable leading from said reverse foot pedal to the operational part of the brake band around the casing grips the casing to gradually stop it from revolving to accordingly attain a reverse speed.

13. In a fully balanced combination over-drive and hydraulic transmission, a rotatable circular casing consisting of a plurality of circular sections comprising four successive cylindrical chambers, a driven shaft concentrically journaled in the casing and through the first and second chambers and a drive shaft concentrically journaled in the casing and through the third and fourth chambers, twin pumping units keyed to the driven shaft and twin motor units keyed to the drive shaft and fitted to rotate in said chambers, a hydraulic ratio between said pumping and motor units, said pumping and motor units consisting of rotors having two segments with a connecting bridge therebetween, said shafts fixed through the centers of said bridges, a sliding piston fitted to slide between said segments, said pistons consisting of two halves, each half being slotted or grooved and having a rectangular opening to allow free motion of the sliding pistons relative to reciprocation after said halves are loosely assembled over the said bridges and shaft and securely bolted or attached together, arcuate pieces positioned alternately and correspondingly and secured in said successive chambers, arcuate beveled end sections of said arcuate pieces imparting reciprocatory motion to said sliding pistons, controllable fluid passages in said casing leading from the first chamber to the third chamber and from the third chamber back to the first chamber for forward drive, and from the second chamber to the fourth chamber and from the fourth chamber back to the second chamber for reverse drive, said passages to converge with the ports in the arcuate beveled end sections of said arcuate pieces, oil channels in the casing over the first and second chambers, each channel to converge with each of the aforesaid oil passages to form a continuous oil circuit around the pumping units and thereby forming two separate, two-way endless oil passages, said pistons having over-drive imparting check valves positioned in their outer end sections with the exception of the piston in the fourth chamber, said valves positioned to have their seats on the pressure imparting sides in the first and second chambers and on the pressure receiving sides in the third chamber, the ports of the two-way tubular oil flow regulating valve in the casing over the second chamber to be kept open additionally while in direct drive to compensate for the unwanted valves in the piston in the fourth chamber, respectively, a gas accelerating and clutch collar operating foot pedal, the hub of said pedal having teeth and keyed to a shaft journaled between two fixed bearings, said teeth intermeshing with the teeth of a cam also keyed to a shaft and journaled between two fixed bearings, said cam having a radial side and radial arc, a reverse foot pedal having a combination toothed hub and projecting cam, said hub keyed to a shaft and journaled between two bearings, said teeth intermeshing with the teeth of the toothed hub of the gas accelerating and clutch collar operating foot pedal, a block having a rod thereof slidably fitted in a fixed slideway, means between said rod and clutch collar to impart reciprocating motion to said collar, a foot brake pedal with its hub rotatably fitted on a fixed shaft, said hub having a cam with a radial slide and a radial arc projecting oppositely to the pedal, the edge joining said radial side and radial arc set to touch the upper edge of the block when the driven shaft is under idling speed to force the block back to its original position before the brake bands of an automobile grip their drums, said radial arc to slide over said edge while applying said brakes, a retracting spring to reposition the foot pedal back to its original position, said foot brake pedal also to be used to reduce speed as a substitute for brake action.

14. In a fully balanced combination over-drive and hydraulic transmission, a rotatable circular casing consisting of a plurality of circular sections comprising four successive cylindrical chambers, a driven shaft concentrically journaled in the casing and through the first and second chambers and a drive shaft concentrically journaled in the casing and through the third and fourth chambers, twin pumping units keyed to the driven shaft and twin motor units keyed to the drive shaft and fitted to rotate in said chambers, a hydraulic ratio between said pumping and motor units, said pumping and motor units consisting of rotors having two segments with a connecting bridge therebetween, said shafts fixed through the centers of said bridges, a sliding piston fitted to slide between said segments, said pistons consisting of two halves, each half being slotted or grooved and having a rectangular opening to allow free motion of the sliding pistons relative to reciprocation after said halves are loosely assembled over the said bridges and shaft and securely bolted or attached together, arcuate pieces positioned alternately and correspondingly and secured in said successive chambers, arcuate beveled end sections of said arcuate pieces imparting reciprocatory motion to said sliding pistons, controllable fluid passages in said casing leading from the first chamber to the third chamber and from the third chamber back to the first chamber for forward drive, and from the second chamber to the fourth chamber and from the fourth chamber back to the second chamber for reverse drive, said passages to converge with the ports in the arcuate beveled end sections of said arcuate pieces, oil channels in the casing over the first and second chambers, each channel to converge with each of the aforesaid oil passages to form a continuous oil circuit around the pumping units and thereby forming two separate, two-way, endless oil passages, said pistons having over-drive imparting check valves positioned in their outer end sections with the exception of the piston in the fourth chamber, said valves positioned to have their seats on the pressure imparting sides in the first and second chambers and on the pressure receiving sides in the third chamber, the ports of the two-way tubular oil flow regulating valve in the casing over the second chamber to be kept open additionally while in direct drive to compensate for the unwanted valves in the piston in the fourth chamber, respectively, including ported, two-way, rotative, adjustable tubular valves journaled in the casing and controlling the fluid in the two separate, two-way, endless oil passages; hydraulically operated rings and pieces conforming to the shape of the pistons and separately operable under hydraulic pressure, a centrifugal and automatic locking and unlocking mechanism including safety means between each of the arcuate pieces and rotors, means to keep the oil passages continually full of oil and prevent over-heating, compensating means to prevent blockage of overdrive, means to accelerate the fuel sufficiently before starting to prevent stalling of the power source for either forward or reverse drive, the speed control valves being set for reverse speed while idling, and means to slow and stop the casing from revolving to accordingly attain a gradual accelerated reverse speed, a foot pedal to accelerate the fuel and reciprocally operate the clutch collar or circular slidable wedge in cooperation with the centrifugal force imparted by centrifugal weights or governors, a reverse speed controlling foot pedal to accelerate the fuel and reciprocally operate the clutch collar or circular sliding wedge, both pedals operate in cooperation with retracting springs, and a foot brake pedal having a retracting spring, said pedals to cooperatively force the transmission mechanism back to its original idling position under manipulation to effect perfect engagements, regulations and disengagements of parts of this mechanism as an aid to durability and to assure safe driving either in forward or reverse speeds, said foot brake pedal being used to reduce speed as a substitute for brake action and to prevent wear of the brake bands.

15. In a fully balanced combination over-drive and hydraulic transmission having coaxial driven and drive shafts and comprising a casing concentrically rotatable about said shafts, said casing comprising four successive chambers, twin pumping units keyed to the driven shaft and twin motor units keyed to the drive shaft, said pumping and motor units carrying hydraulic fluid impellers, means to actuate said impellers secured in said chambers, controllable fluid passages in said casing, one leading from the first to the third chamber and from the third chamber back to the first chamber for forward drive, and the other from the second chamber to the fourth chamber and from the fourth chamber back to the second chamber for reverse drive, said passages converging with said chambers, oil channels in the casing over the first and second chambers, each channel to converge with each of the aforesaid oil passages at right angles to form a continuous oil circuit around the pumping units and thereby forming two separate, two-way, endless oil passages, said impellers having over-drive imparting check valves positioned in their outer end sections with the exception of the impeller in the fourth chamber, said valves positioned to have their seats on the pressure imparting sides in the first and second chambers and on the pressure receiving sides in the third chamber, the ports of the two-way tubular oil flow regulating valve in the casing over the second chamber to be kept open additionally while in direct drive to compensate for the unwanted valves in the impeller in the fourth chamber and permitting the motor units to freely revolve under momentum imparted to the drive shaft and permitting locks to unlock, said means to assure perfect over-drive, substantially as described.

OTTO J. EISELE.

REFERENCES CITED

The following references are of record in the file of this patent:

UNITED STATES PATENTS

| Number | Name | Date |
|---|---|---|
| 920,976 | Minor | May 11, 1909 |
| 1,057,251 | Manley | Mar. 25, 1913 |
| 1,080,282 | Kellogg | Dec. 2, 1913 |
| 1,294,121 | Lape | Feb. 11, 1919 |
| 1,603,437 | Wingquist | Oct. 19, 1926 |
| 2,379,938 | Swanson | July 10, 1945 |
| 2,418,292 | Eisele | Apr. 1, 1947 |
| 2,421,013 | Cornwell | May 27, 1947 |
| 2,486,467 | Devine | Nov. 1, 1949 |